(12) United States Patent
Baumgartner

(10) Patent No.: US 7,455,330 B2
(45) Date of Patent: Nov. 25, 2008

(54) QUICK COUPLING

(75) Inventor: Hans Baumgartner, Zollikerberg (CH)

(73) Assignee: Kulm Holding AG (CH)

( * ) Notice: Subject to any disclaimer, the term of this patent is extended or adjusted under 35 U.S.C. 154(b) by 232 days.

(21) Appl. No.: 11/117,843

(22) Filed: Apr. 28, 2005

(65) Prior Publication Data

US 2006/0244258 A1  Nov. 2, 2006

(51) Int. Cl.
*F16L 19/06* (2006.01)
*F16L 19/08* (2006.01)

(52) U.S. Cl. .................. 285/340; 285/23; 285/319; 285/341; 285/921

(58) Field of Classification Search .............. 285/23, 285/319, 340–343, 921
See application file for complete search history.

(56) References Cited

U.S. PATENT DOCUMENTS

| | | | | |
|---|---|---|---|---|
| 1,516,397 A | * | 11/1924 | Mueller et al. | 285/340 |
| 3,075,792 A | * | 1/1963 | Franck | 285/148.27 |
| 3,291,510 A | * | 12/1966 | Kody | 285/340 |
| 3,312,484 A | * | 4/1967 | Davenport | 285/340 |
| 3,580,617 A | * | 5/1971 | Ehrenberg | 285/340 |
| 3,827,734 A | * | 8/1974 | Brown | 285/379 |
| 3,924,881 A | * | 12/1975 | O'Connor | 285/133.21 |
| 4,072,328 A | * | 2/1978 | Elliott | 285/148.28 |
| 4,225,162 A | * | 9/1980 | Dola | 285/139.1 |
| 4,293,149 A | * | 10/1981 | Bonel | 285/111 |
| 4,538,842 A | * | 9/1985 | Kowal et al. | 285/354 |
| 4,630,848 A | | 12/1986 | Twist et al. | |
| 4,632,437 A | * | 12/1986 | Robson et al. | 285/310 |
| 4,635,975 A | * | 1/1987 | Campbell | 285/340 |
| 4,664,427 A | * | 5/1987 | Johnston | 285/340 |
| 4,786,085 A | * | 11/1988 | Sauer et al. | 285/24 |
| 4,964,657 A | * | 10/1990 | Gonzales | 285/8 |
| 5,288,087 A | * | 2/1994 | Bertoldo | 277/616 |
| 5,603,530 A | | 2/1997 | Guest | |
| 6,464,266 B1 | * | 10/2002 | O'Neill et al. | 285/340 |

FOREIGN PATENT DOCUMENTS

| | | | |
|---|---|---|---|
| EP | 0610538 A1 | * | 2/1993 |
| EP | 0 696 342 | | 1/1997 |
| EP | 1 215 434 | | 8/2005 |
| GB | 2060106 A | * | 8/1979 |
| GB | 2071798 A | * | 3/1980 |
| GB | 2155576 A | * | 3/1985 |
| GB | 2182743 A | * | 9/1985 |
| GB | 2 334 562 | | 8/1999 |
| JP | 2-107885 | * | 4/1990 |
| WO | WO 90/08288 | | 7/1990 |
| WO | WO 94/25786 | * | 4/1994 |

* cited by examiner

*Primary Examiner*—Aaron Dunwoody
*Assistant Examiner*—Fannie Kee
(74) *Attorney, Agent, or Firm*—Bachman & LaPointe, P.C.

(57) ABSTRACT

A quick coupling (1) comprising a sleeve-shaped coupling body (3) with a receiving opening (4) to receive one end (5) of a pipe (2), a retaining element (7) to hold the end (5) of the pipe in the coupling body (3), a sealing element (8) to seal the pipe (2) against the coupling body (3) and a securing element (9) to secure the connection between the pipe (2) and the coupling body (3), in conjunction with first and second locking ribs (23,24) adjacent to the receiving opening (4) on an external surface (21) of the coupling body (3), which ribs extend outwards in a radial direction and interact with the securing element (9) for the purpose of securing a connection between the pipe (2) and the coupling body (3).

3 Claims, 6 Drawing Sheets

QUICK COUPLING

BACKGROUND OF THE INVENTION

The invention relates to a quick coupling comprising a sleeve-shaped coupling body with a receiving opening intended to receive one end of a pipe, a retaining element to hold the end of the pipe in the coupling body, a sealing element to seal the pipe against the coupling body and a securing element to secure the connection between the pipe and the coupling body.

In pipe engineering, use is being made increasingly of pipe connection components which are capable of producing a pipe connection as rapidly and securely as possible simply by insertion. Different embodiments are previously disclosed depending on the area of application. Embodiments made of plastic are previously disclosed for aggressive media. Temperature-resistant materials, for example polyamides, are used for high temperatures, and where high media pressures are encountered, the connections between the pipe and the sleeve body are secured by means of a screwed connection, for example with a union nut.

Previously disclosed in EP 696342 A1 is a quick coupling for pipes or hoses. The quick coupling consists of a receiving area and a connection area. The end of a pipe is received in the sleeve-shaped receiving area, and the quick coupling is connected to further pipe components with the connection area. A specially executed securing ring, a spacer ring and a sealing ring are arranged one after the other in the receiving area, viewed from the connection area. The receiving area is terminated with a retaining ring. The receiving area is reinforced on the outside with a reinforcing collar made of aluminum. The securing ring is made of metal and exhibits a U-shaped profile. Both ends of the U-profile point in the direction of the end of the pipe. The inner, inclined part of the securing ring engages in the outer wall of the pipe, in order to prevent the pipe from being pulled out. The outer, straight part engages in the floor of the receiving area in order to permit the pipe to be rotated out.

Taking the state of the art described above as the departure point, the object of the invention is to make available a quick connection, the construction of which involves the manufacture of the least possible number of component parts, and the final assembly of which can be effected as simply and securely as possible.

SUMMARY OF THE INVENTION

The object is achieved by means of a quick connection comprising a sleeve-shaped coupling body with a receiving opening to receive one end of a pipe, a retaining element to hold the end of the pipe in the coupling body, a sealing element to seal the pipe against the coupling body and a securing element to secure the connection between the pipe and the coupling body, in conjunction with which locking ribs are executed on the outer surface adjacent to the receiving opening of the coupling body as radial reinforcements for the coupling body.

It is advantageous for the quick coupling, after manufacturing the individual components, to be capable of simple pre-assembly. This is achieved by the securing element being capable of being manufactured from a plastic material by an injection molding process in such a way that the free ends adopt an elastic and resilient form. This is also achieved in that the securing element is executed essentially in the form of a U-shaped profile, in conjunction with which the free ends of the securing element are so arranged as to engage around the receiving opening of the coupling body. Locking projections facing radially inwards and outwards are formed at the free ends of the securing element, in conjunction with which the locking projections are executed so as to interact with the locking ribs.

BRIEF DESCRIPTION OF THE DRAWINGS

An illustrative embodiment of the invention is described with reference to the following Figures, in which.

DETAILED DESCRIPTION

Figure 1:
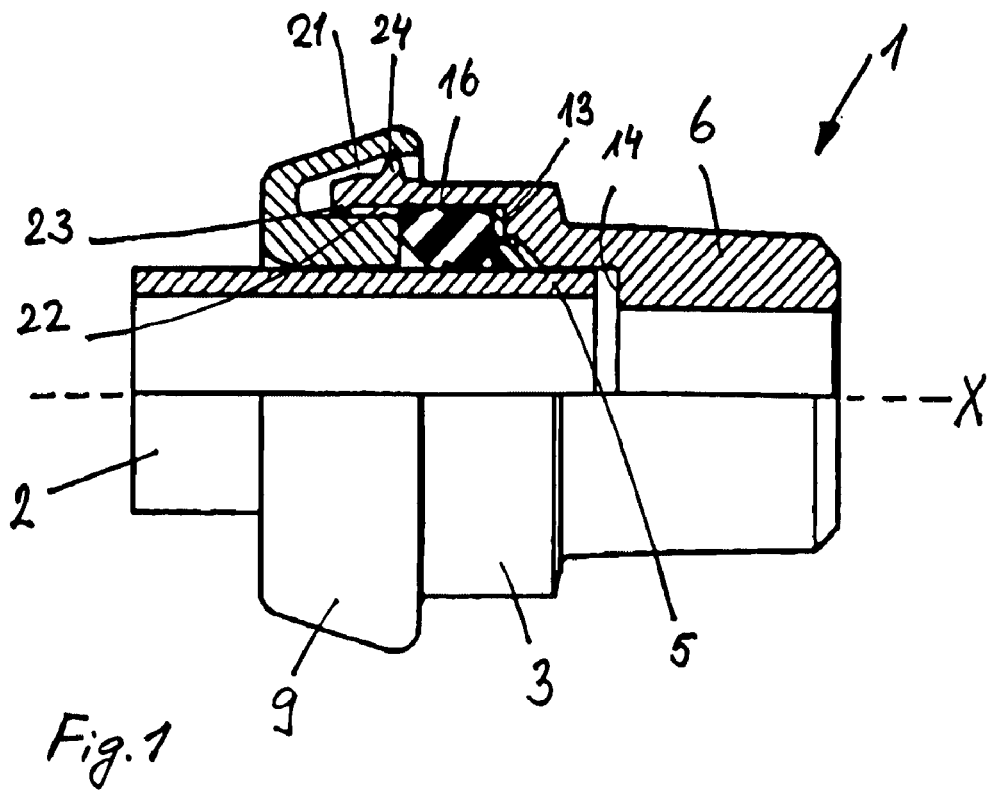
FIG. 1 illustrates a partial section through a quick coupling in accordance with the invention with a pipe.

A quick coupling 1 with a pipe 2 is shown partially sectioned in FIG. 1. The same quick coupling 1 is shown again in FIG. 2, but without the pipe 2. The quick coupling 1 consists of a coupling body 3 with a receiving opening 4. The end 5 of the pipe 2 is inserted into the receiving opening 4, as into a sleeve, to produce a connection with the pipe 2. The coupling body 3 is illustrated in the form of a sleeve on the left-hand side in FIG. 1. A connection area 6 is illustrated schematically on the right-hand side. The connection area 6 is used to connect the quick coupling 1 and the pipe 2 to, medium-carrying pipes or apparatuses. The connection area 6 can be screwed into or welded to an opening in a container, for example. The connection area 6 can also be executed symmetrically as a mirror image as a further sleeve-shaped coupling body.

The quick coupling 1 receives a retaining element 7, a sealing element 8 and a securing element 9 one after the other, viewed from the connection area 6, in the sleeve-shaped coupling body 3. The retaining element 7 is represented here as a closed ring with a flange ring 11 and with teeth 12 facing inwards at an angle. The flange ring 11 lies perpendicular to the axis x of the pipe 2 and thus parallel to a first shoulder 13 in the coupling body 3. The teeth 12 face at an angle towards the end 5 of the pipe 2. The retaining element 7 is made in a single piece from a material that is considerably harder and more rigid than the material of the pipe 2. The retaining element 7 can be made from a metal or from a plastic material, depending on the nature of the medium that is conveyed inside the pipe.

The teeth 12 facing inwards at an angle admit the end 5 when the pipe 2 is inserted and prevent the pipe 2 from being pulled out of the quick coupling 1 once it has been inserted. The pipe 2 is inserted as far as a second shoulder 14 in the coupling body. FIG. 1 shows how the pipe 2, when it is subjected to a load, i.e. either by a pulling force which is applied to the pipe externally, or by a pressure which acts upon the pipe from the inside, is displaced only to a small degree. The internal diameter of the retaining element 7 in the unloaded state essentially coincides with the external diameter of the pipe 2. The external circumference of the second shoulder 14 is also adapted to the external diameter of the pipe 2. Effective guiding of the pipe 2 in the coupling body 3 is achieved in this way.

The dimensional variations, which are due to manufacturing tolerances and leave a gap between the sleeve body 3 and the pipe 2, are absorbed by the sealing element 8. The sealing element 8 is made of a considerably softer material than the retaining element 7. In order to ensure a good seal between the coupling body 3 and the pipe 2, the sealing element 8 is executed as a ring with a rectangular profile. A plurality of sealing ribs 15,16 are formed on the radially inward-facing and outward-facing walls of the sealing element 8. The sealing ribs 15,16 face inwards and outwards, in the manner of a saw tooth. Adequate sealing of the coupling body 3 is achieved through the arrangement of the sealing ribs 15,16 and through the dimensioning and flexibility of the material. The sealing element 8 is capable, because it has a rectangular profile, of being connected before pre-assembly by gluing to the parallel flange ring 11 of the retaining element 7 to form a single unit.

The securing element 9 is also pre-assembled in the coupling body 3 at the pre-assembly stage. The securing element 9 is executed as a ring with a U-shaped profile. The free ends 17,18 of the U engage around the receiving opening 4 of the coupling body 3. The securing element 9 is made from a plastic material by an injection molding process. The free ends 17,18 of the securing element 9 are executed with an elastic and resilient form and exhibit locking projections 19,20 facing perpendicularly inwards in each case on the inside of the U. Also arranged on the external surface 21 and the internal surface 22 of the coupling body 3 are locking ribs 23,24, which interact with the locking projections 19,20 in order to effect locking.

Figure 2:
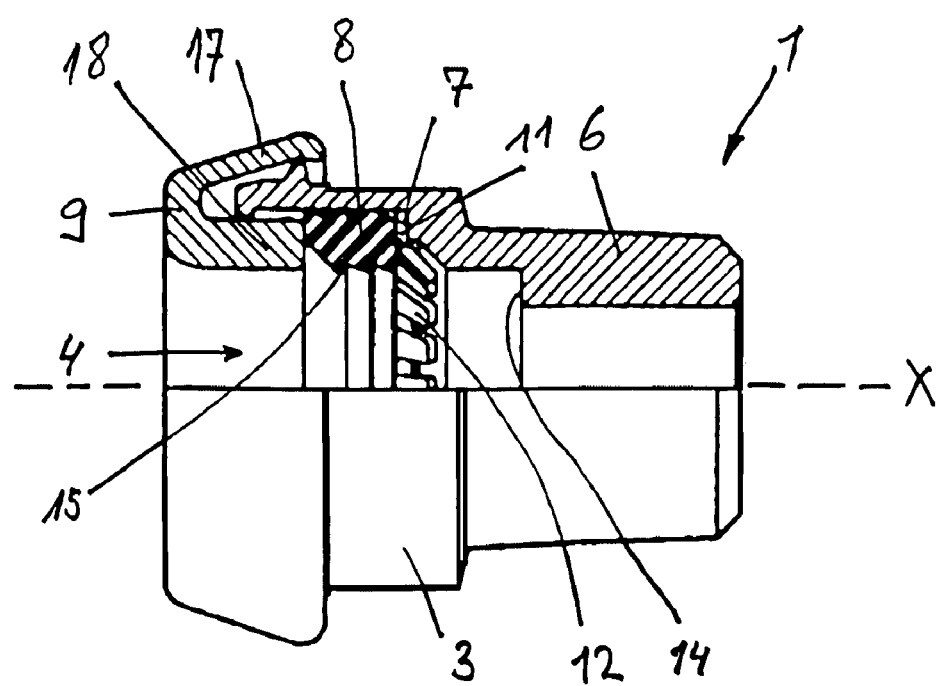
FIG. 2 illustrates a partial section through the quick coupling in FIG. 1 without the pipe.
Figure 3:
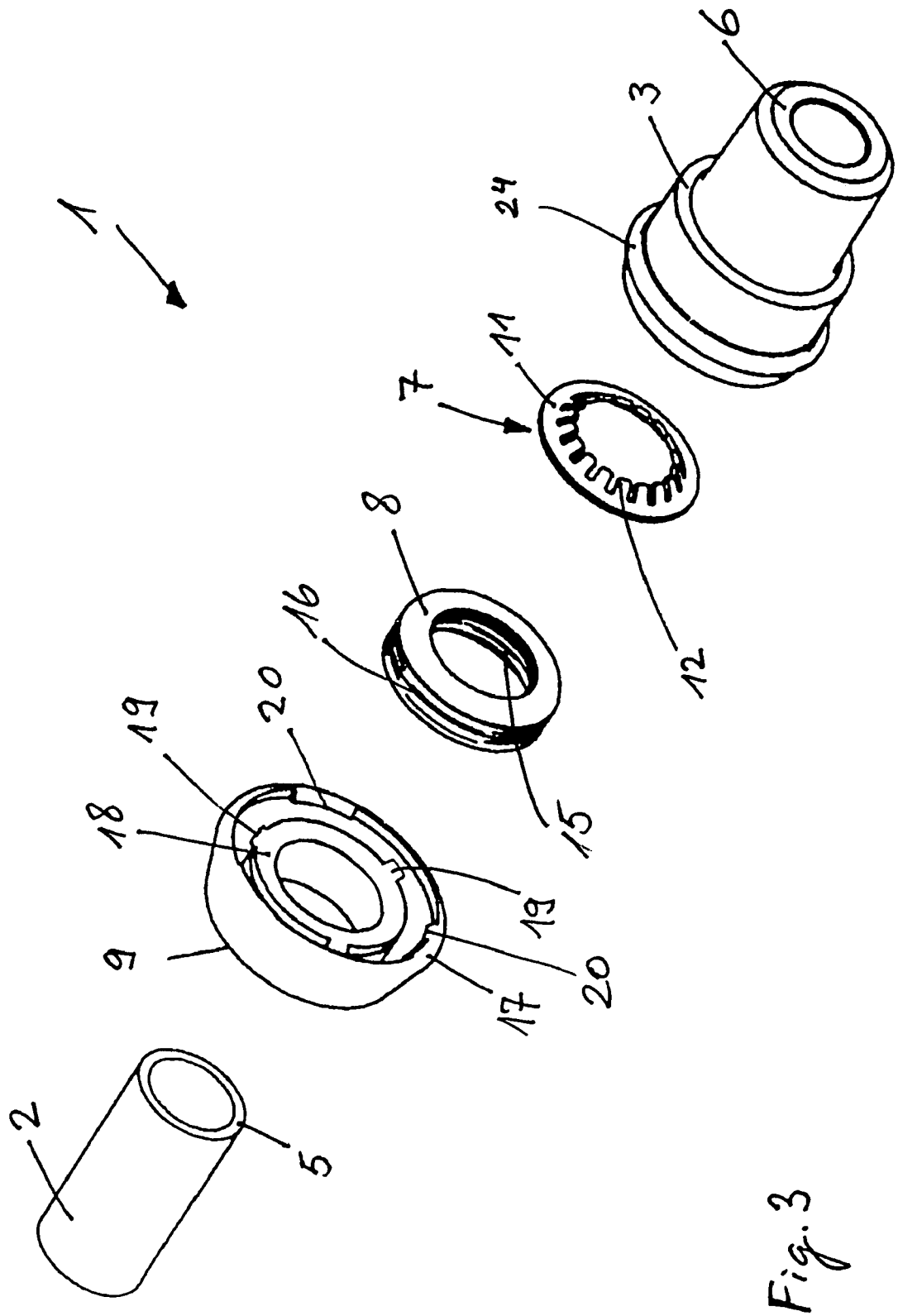
FIG. 3 illustrates a view of the quick coupling in FIG. 1 as a perspective exploded representation.

The quick coupling 1 is illustrated in FIG. 3 as a perspective view in the manner of an exploded representation. The outward-facing locking projections 19 and the inward-facing locking projections 20 can be seen on the securing element 9. The outward-facing locking projections 19 interact with the first locking rib 23, which can be seen in FIGS. 1 and 2 at the end of the receiving opening 4 on the inside of the coupling body 3. The inward-facing locking projections 20 interact with the second locking rib 24, which can be seen in FIGS. 1, 2 and 3 on the outside of the coupling body 3. The locking ribs 23, 24 form a radial reinforcement on the periphery of the wall of the coupling body 3. The manner in which these locking projections 19,20 are arranged regularly around the periphery in each case at an angular separation of 120° can be seen in FIG. 3.

The second, outer locking rib 24 is, in comparison with the first, inner locking rib 23, executed at a different distance from the end of the coupling body 3. By this means, the securing element 9 can be attached to the coupling body 3 at two points: a first, front pre-locking position and a second, rear final locking position. The quick coupling 1 is pre-assembled and supplied with the securing element 9 in the pre-locking position and can be brought by the user into the rear final locking position after inserting the end 5 of the pipe. Secure assembly can be verified by a clearly audible click produced by the locking ribs 23,24 and the locking projections 19,20. The sealing ribs 15,16 on the inner and outer wall of the sealing element 8 can also be seen in FIG. 3.

Figure 4:
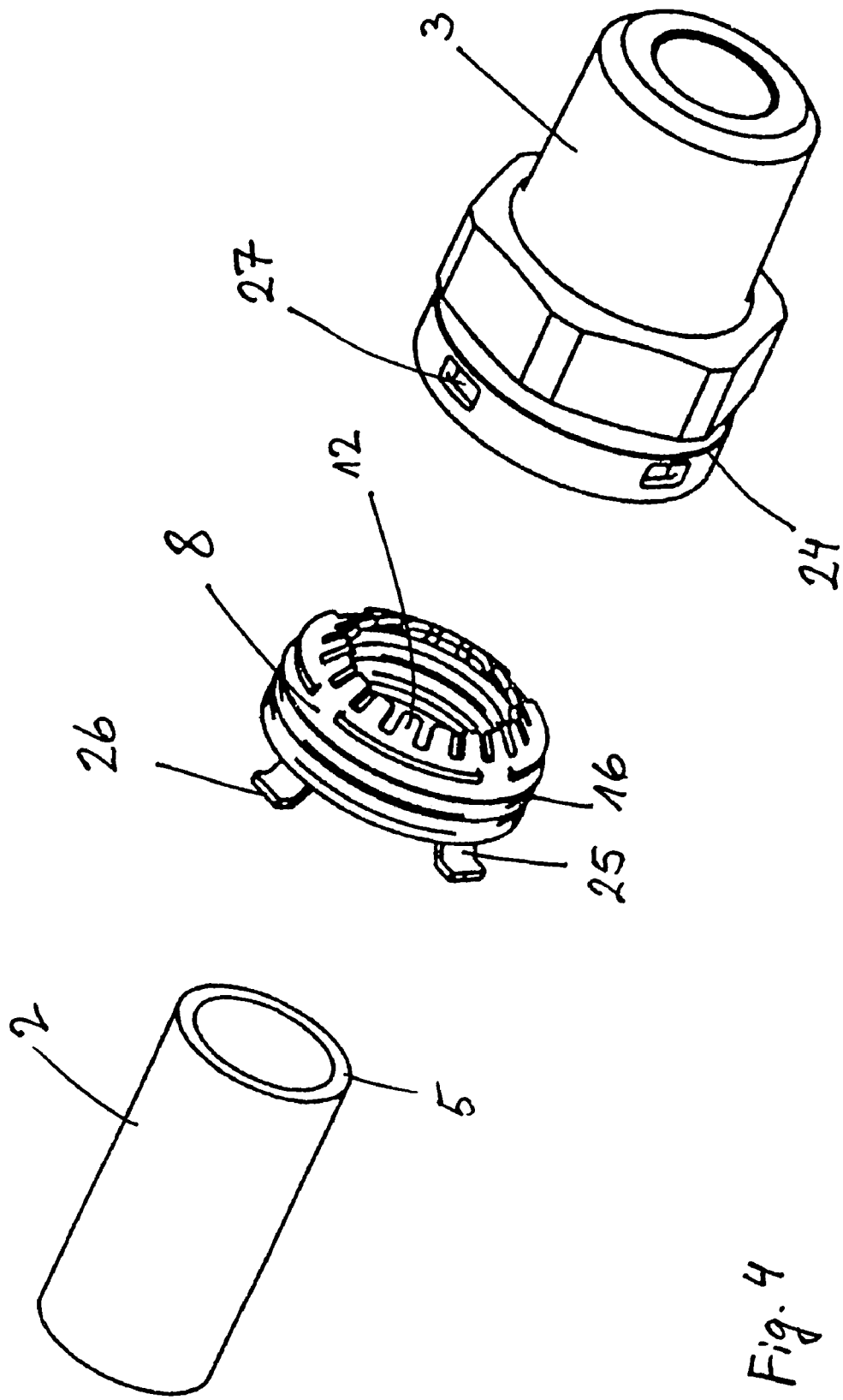
FIG. 4 illustrates a view of a further illustrative embodiment of the quick coupling in accordance with the invention as a perspective exploded representation.
Figure 5:
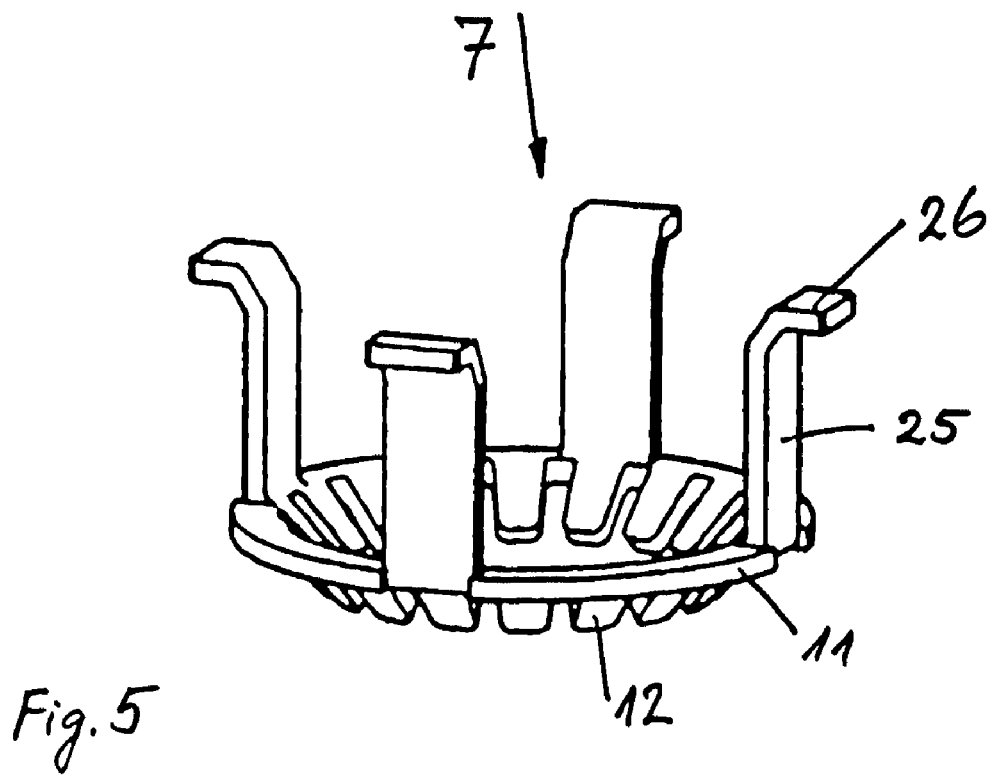
FIG. 5 illustrates a view of a retaining element in the quick coupling in FIG. 4.
Figure 6:
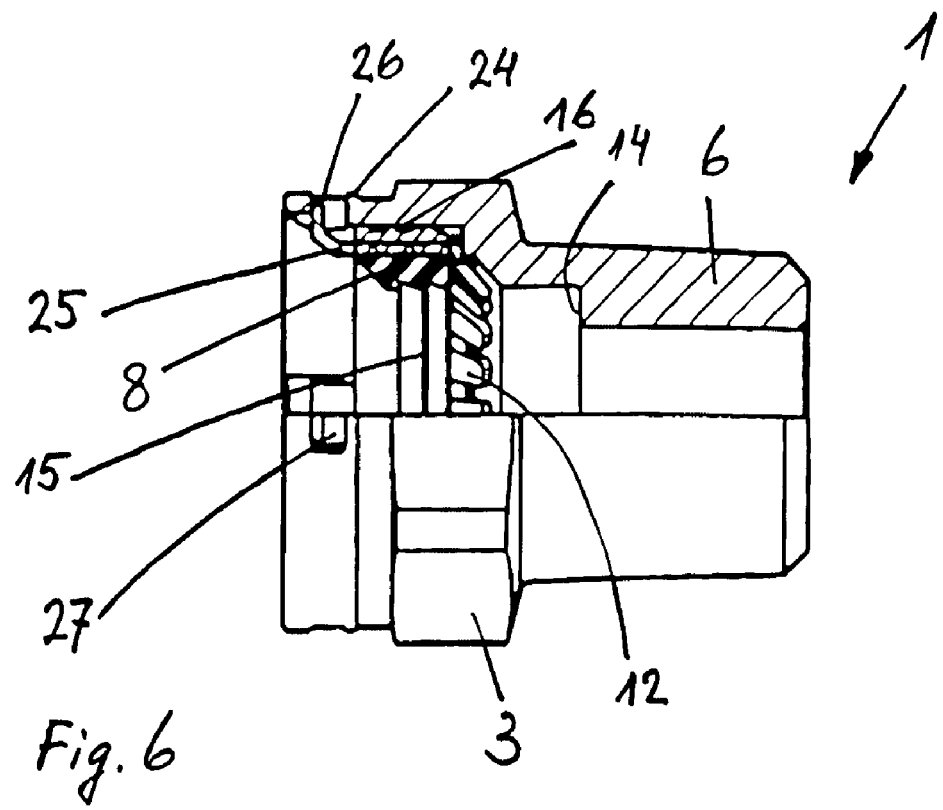
FIG. 6 illustrates a partial section through the quick coupling in FIG. 4 without the pipe.

A second illustrative embodiment of the quick coupling 1 is represented in FIGS. 4, 5 and 6. Unlike the embodiment in FIGS. 1, 2 and 3, the retaining element 7 exhibits a plurality of arms 25 attached to the radially oriented flange ring 11, which arms are oriented in an axial direction. The arms 25 exhibit locking fingers 26 at each of their ends. The locking fingers 26 engage in matching openings 27 in the wall of the coupling body 3. Secure positioning of the retaining element 7 inside the coupling body 3 in the radial and axial directions is achieved in this way. In the illustrative embodiment in FIG. 4, the retaining element 7 and the sealing element 8 have been manufactured together as a single unit.

The retaining element 7, which is manufactured from a plastic material for example, is attached to a one-piece element by extruding the arms 25 with the elastomer sealing element 8. A one-piece element is produced in this way, which performs both the retaining function and the sealing function. As a consequence of this, stocks of only a few parts require to be maintained. Pre-assembly of the quick coupling 1 is accordingly simpler and more rapid.

The retaining element 7, which is extruded together with the sealing element 8, is illustrated on its own in FIG. 5. In order to permit comparison with the quick coupling in FIG. 2, however, the quick coupling 1 is illustrated as a sectioned view in FIG. 6 without the end 5 of a pipe and without the securing element 9.

Figure 7:
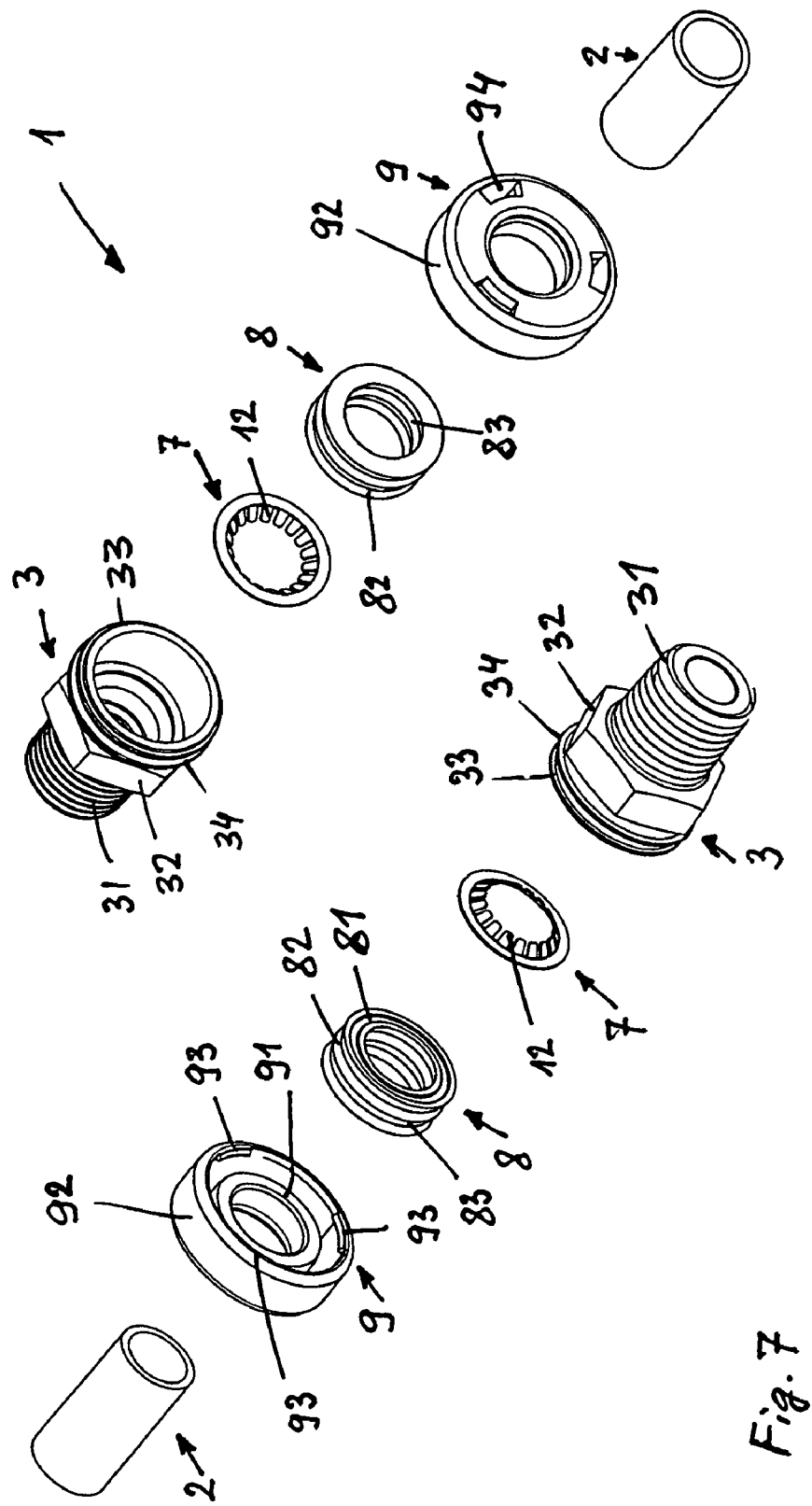
FIG. 7 illustrates a view of a further illustrative embodiment of the quick coupling in accordance with the invention as a perspective exploded representation.

A third illustrative embodiment of the quick coupling 1 is shown twice as a perspective representation in FIG. 7. A pipe 2, a securing element 9, a sealing element 8, a retaining element 7 and a coupling body 3 are represented one after the other, as in FIG. 3. The coupling body 3 is executed as a screw-in sleeve 3 with a connection area executed as a thread 31 and with an attachment area executed as a hexagonal nut 32. In this way, the coupling body 3 can be screwed into holes in the walls of containers or into additional pipe connection elements, for example. Two annular locking ribs 33,34 are executed at the opposite end of the coupling body 3 on the outer periphery. The first locking rib 33, which is executed immediately adjacent to the end of the coupling body 3, has a smaller external diameter than the second locking rib 34, which is executed between the first locking rib 33 and the nut 32.

The retaining element 7 is identical with the retaining element in FIGS. 1 to 3. The sealing element is executed essentially as a ring 8 made from an elastomer material with a rectangular profile. An annular groove 81 is executed on the face of the ring 8 facing towards the screw-in thread 31. Sealing beads 82 and interjacent constrictions 83 are executed on the inside and the outside of the ring 8. The groove 81, the sealing beads 82 and the constrictions 83 serve to increase the elasticity of the sealing element 8. This enables the sealing effect of the ring 8 to be assured, even in the case of quite large variations in the tolerance of the dimensions of the coupling body 3 and the pipe 2.

The securing element 9 is executed in a similar fashion to the securing element in FIGS. 1 to 3. The securing element 9 consists of two rings 91,92, with different diameters, which are so arranged as to lie one inside the other. The rings are executed as the legs of a U and are attached to one another. The inner ring 91 has a shorter length, viewed in the axial direction, than the outer ring 92. The outer ring 92 exhibits locking projections 93 oriented radially inwards, which interact with the locking ribs 33,34 on the outer periphery of the coupling body 3. The locking projections 93 are uniformly distributed around the periphery of the outer ring 92. Three locking projections 93 are represented in FIG. 7. In order to simplify manufacture of the securing element 9, gaps 94 for parts of the injection molding tool are provided in the area between the legs of the U. It is possible by this means to achieve easier removal of the securing element 9 from the mold as an injection-molded component during manufacture.

Figure 8:
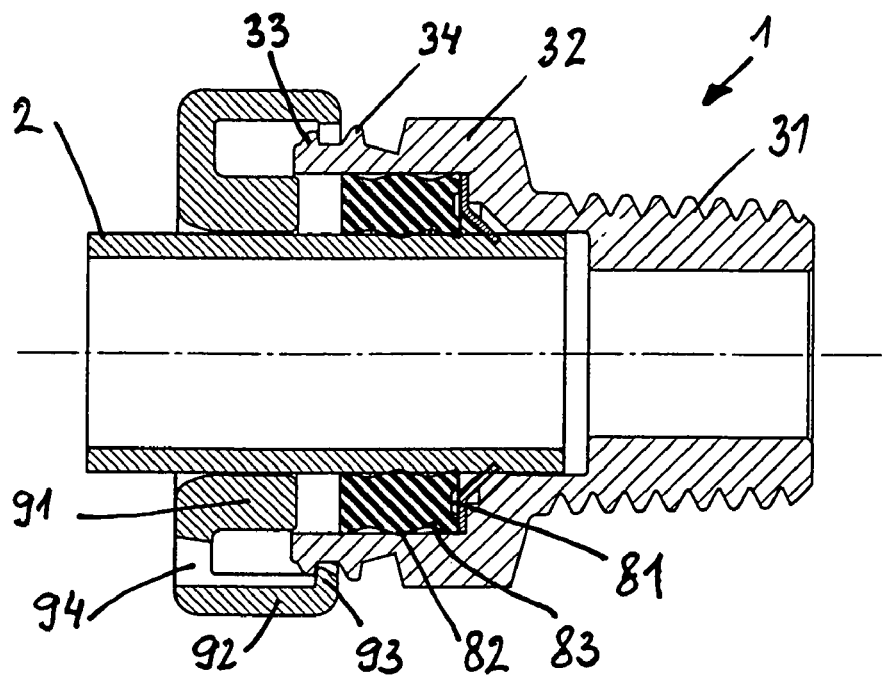
FIG. 8 illustrates a section through the quick coupling in FIG. 7 in a first, locked position.
Figure 9:
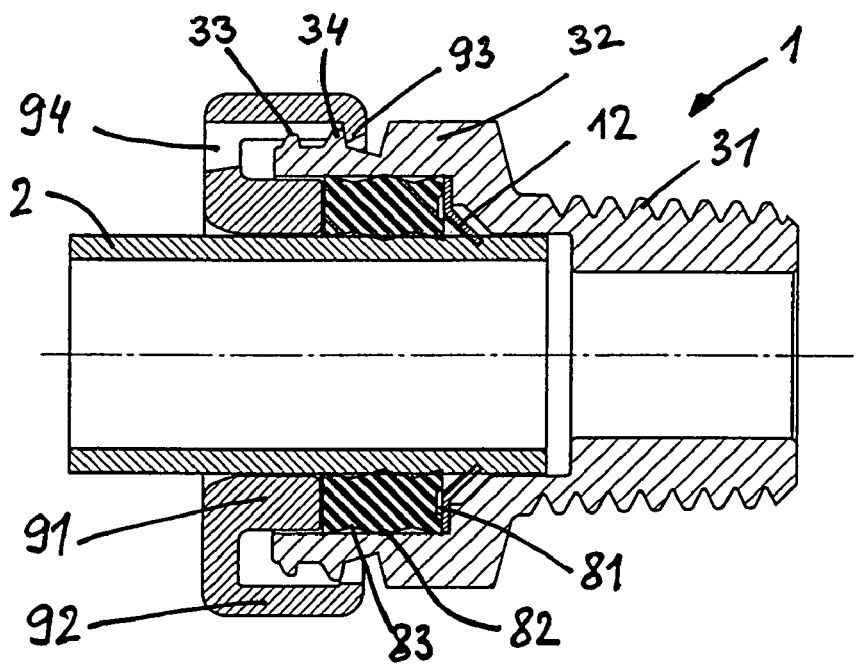
FIG. 9 illustrates a section through the quick coupling in FIG. 7 in a second, locked position.

The quick coupling 1 in FIG. 7 is shown as a sectioned view in FIGS. 8 and 9. The state of the quick coupling after delivery to the customer is illustrated in FIG. 8. The securing element 9 is engaged with the locking projections 93 behind the first locking rib 33 of the coupling body 3. In this position, the pipe 2 can be introduced into the coupling body 3.

In FIGS. 7-9, the securing element 9 is engaged with the locking projections 93 of the outer ring 92 behind the second locking rib 34 of the coupling body 3. In this position, the inner ring 91 of the securing element 9 exerts a pressure on the sealing element 8 acting in the axial direction. In this position, the pipe 2 is attached to the coupling body 3 in such a way that it is sealed against the medium. The retaining element 7 is pressed in between the coupling body 3 and the sealing element 8, and the inward-inclined teeth 12 of the retaining element 7 engage in the external wall of the pipe 2. The inclined position of the teeth 12 prevents the pipe 2 from being pulled out of the coupling body 3. Also illustrated in FIG. 9 is the manner in which the sealing beads 82 touch the walls of the coupling body 3 and the pipe 2, and the manner in which the sealing element 8 is caused to deform thereby.

With the quick coupling 1 proposed here, a simple pipe connection element is offered, which is constructed from a small number of individual components, which element is supplied in the pre-assembled state and which avoids the need for the end user to use special tools, such as crimping pliers. The pipe can be inserted into the quick coupling without special processing or preparation of the end of the pipe. This means that, even in the event of a subsequent repair, the connection can be separated easily, and the pipe can then be re-inserted into a new quick connector. The quick connector 1 can be constructed entirely from plastic components and is suitable in particular for fairly small pipe diameters. The quick coupling 1 can be used both for pipes carrying a medium and for the secure and sealing passage of cables or rods through walls.

The invention claimed is:

1. A quick coupling comprising:
a sleeve-shaped coupling body having a longitudinal axis and a receiving opening to receive one end of a pipe,
a retaining element to hold the end of the pipe in the coupling body wherein the retaining element is formed of a material harder than that of the pipe and comprises a flange portion having a plurality of teeth extending radially inward at an angle relative to the longitudinal axis which contact the pipe and prevent the pipe from being pulled out of the coupling,
a sealing element in the form of a ring with a rectangular profile in cross section to seal the pipe against the coupling body, wherein the sealing element has an annular groove and sealing beads and constrictions are formed on the sealing element, and
a securing element to secure the connection between the pipe and the coupling body wherein the sealing element is located between the retaining element and the coupling body,
first and second annular locking ribs adjacent to the receiving opening and located one behind the other on an external surface of the coupling body, which ribs extend outwards in a radial direction with respect to the longitudinal axis and interact with the securing element for the purpose of securing a connection between the pipe and the coupling body, the first locking rib, which is adjacent to the end of the coupling body, having a smaller external diameter than the second locking rib, which is between the first locking rib and a stop of the coupling body,
the securing element comprising two rings, which have different diameters and are arranged to lie one inside the other and are, in cross section, in the form of a U and are attached to one another to form a single unit, the rings comprising a radially inner ring, and a radially outer ring and wherein locking projections oriented radially inwards on the radially outer ring of the securing element interact with the locking ribs of the coupling body for the purpose of locking a pipe in place.

2. A quick coupling as claimed in claim 1, wherein the securing element is in the form of a profile having free ends which define a gap of the securing element for receiving a wall of the coupling body in the area of the receiving opening.

3. A quick coupling as claimed in claim 1, wherein the coupling body comprises a screw-in sleeve with a screw thread and a hexagonal nut.

\* \* \* \* \*